United States Patent [19]

Tabuchi

[11] Patent Number: 5,923,875
[45] Date of Patent: Jul. 13, 1999

[54] LOAD DISTRIBUTING JOB PROCESSING SYSTEM

[75] Inventor: Koji Tabuchi, Tokyo, Japan

[73] Assignee: NEC Corporation, Tokyo, Japan

[21] Appl. No.: 08/697,564

[22] Filed: Aug. 28, 1996

[30] Foreign Application Priority Data

Aug. 28, 1995 [JP] Japan ..................................... 7-242541

[51] Int. Cl.⁶ ....................................................... G06F 9/00
[52] U.S. Cl. ........................................... 395/675; 395/672
[58] Field of Search .................................... 395/670, 671, 395/672, 674, 675, 200.54

[56] References Cited

U.S. PATENT DOCUMENTS

| | | | |
|---|---|---|---|
| 4,633,387 | 12/1986 | Hartung et al. | 395/675 |
| 5,239,649 | 8/1993 | McBride et al. | 395/675 |
| 5,517,622 | 5/1996 | Ivanoff et al. | 395/200.54 |
| 5,539,883 | 7/1996 | Allon et al. | 395/675 |
| 5,655,120 | 8/1997 | Wille et al. | 395/675 |

FOREIGN PATENT DOCUMENTS 5-324582  12/1993  Japan.

Primary Examiner—Majid A. Banankhah
Attorney, Agent, or Firm—Foley & Lardner

[57] ABSTRACT

A load judging means 21 judges whether or not to receive the job transferred from the job transferring unit 1 based on the calculated result of the load of the computer wherein the load judging means 21 itself sits in. A backlog controlling means 23 generates a backlog corresponding to the job which was judged as unreceivable, controls to erase and change the backlog, and requests rescheduling the backlog when the backlog was generated or erased. A job queuing means 27 requests rescheduling the backlog when there are any changes in the states of jobs under process or unprocessed. A job transfer requesting means 26 issues a request for transferring the object job when the backlog scheduling means 25 judges the object job as receivable.

10 Claims, 4 Drawing Sheets

LOAD DISTRIBUTING JOB PROCESSING SYSTEM

BACKGROUND OF THE INVENTION

1. Field of the Invention

In a computer system in which plural computers performing batch processes by jobs are connected into a network, the present invention relates to a load distributing job processing system that executes jobs with loads distributed among computers.

2. Description of the Related Art

The Japanese Patent Laid-open No. Hei 5-324582 discloses a computer system wherein plural computers performing batch processes by jobs are connected into a network, wherein a job is registered in a queue of a computer having the least load by checking load states of the computers designated at the job registry and queues of the computers.

In this conventional technique, executing an unprocessed job already assigned to a computer makes it impossible to correctly predict the load imposed on the computer.

And, executing other jobs simultaneously in the computer makes it difficult to correctly predict the load imposed on the computer.

Further, since jobs cannot suitably be assigned to the computers due to the presence of these problems, the loads among the computers each become uneven. Thus, a problem is created that unprocessed jobs are piled up on one group of computers and on the other hand some computers have completed jobs and are waiting for job assignment.

SUMMARY AND OBJECTS OF THE INVENTION

It is therefore an object of the present invention to enhance the total throughput of the computer system wherein plural computers performing batch processes by jobs are connected into a network.

It is another object of the present invention to even the loads among the computers in the computer system wherein plural computers performing batch processes by jobs are connected into a network.

A first load distributing job processing system of the present invention is such that each of plural computers performing batch processes by jobs, connected into a network, is provided with the following configuration:

at least one job transfer unit that enters the job; and at least one job executing unit that receives and executes the job entered by the job transfer unit when the computer in the job executing unit has a low load, does not receive the job and stores data relating to the job in a backlog when the computer in the job executing unit has a high load, and when the load of the computer thereafter becomes low, fetches the data relating to the job from the backlog and based on the data requests the job transfer unit to transfer the job and receives and executes the job.

A second load distributing job processing system of the present invention is such that, in the first load distributing job processing system, the job transfer unit is provided with the following configuration:

first job sending means enters the job and transfers the job to the job executing unit designated as a transfer destination for the job;

job waiting controlling means records the job in a waiting state when the job executing unit does not receive the job transferred by the first job sending means; and second job sending means receives a job transfer request transferred from the job executing unit, releases a job designated in the job transfer request, of the jobs recorded by the job waiting controlling means, from the waiting state, and transfers the job to the job executing unit designated in the same manner.

A third load distributing job processing system of the present invention is such that, in the first load distributing job processing system, the job transfer unit is provided with the following configuration:

job entering means enters the job and designates at least one of the job executing units to which the job is transferred as a transfer destination;

first job sending means transfers the job entered by the job entering means to the job executing unit designated as the transfer destination;

job waiting controlling means records the job in a waiting state when any of the job executing units does not receive the job transferred by the first job sending means;

job transfer request receiving means receives a job transfer request transferred from the job executing unit, and releases a job designated in the job transfer request, of the jobs recorded by the job waiting controlling means, from the waiting state; and second job sending means transfers the job released from the waiting state by the job transfer request receiving means to the job executing unit designated in the job transfer request.

A fourth load distributing job processing system of the present invention is such that, in the second or third load distributing job processing system, the job executing unit is provided with the following configuration:

load judging means calculates the load of the computer of the job executing unit from a preset criterion and based on the calculated result judges whether or not to receive the job transferred from the job transfer unit;

job receiving means receives the job transferred from the first job sending means or the second job sending means when the load judging means judges to receive the job;

backlog controlling means generates as a backlog an information on the job that the job receiving means did not receive, when the load judging means judged not to receive the job, and requests rescheduling the backlog when the backlog was generated or deleted;

backlog recording means records a backlog generated by the backlog controlling means;

job queuing means sequentially records jobs received by the job receiving means on a queue, and requests rescheduling the backlog when there are any changes in the states of jobs under process or unprocessed;

backlog scheduling means, responding to the request for rescheduling the backlog from the backlog controlling means or the job queuing means, fetches an object backlog from the backlog recording means to acquire an information on the job recorded on the backlog, and judges whether or not to receive the job by the load judging means;

job transfer requesting means requests transferring the job to the job transfer unit when the backlog scheduling means judges to receive the job; and job executing means fetches the job one after another from the head of the queue of the job recorded by the job queuing means, and executes the job.

A fifth load distributing job processing system of the present invention is such that the fourth load distributing job processing system is provided with the following configuration:

the job transfer unit further includes a job transfer completion informing means for informing all the job executing units designated as a transfer destination for the job that the transfer of the job is completed when the first job sending means or second job sending means succeeds in transferring the job;

the job executing unit further includes a job transfer completion information receiving means for receiving the information that the transfer of the job is completed from the job transfer completion informing means and requests the backlog controlling means to delete the backlog relating to the job;

and the backlog controlling means further deletes the backlog requested by the job transfer completion information receiving means from the backlog recording means.

A sixth load distributing job processing system of the present invention is such that the fourth or fifth load distributing job processing system is provided with the following configuration:

the load judging means judges that the job can be received when the added value by the number of jobs under process and unprocessed recorded on the job queuing means and the number of the backlogs in transfer waiting state recorded on the backlog recording means is less than the preset threshold value.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

Here, it should be noted that like reference numerals represent like elements throughout the disclosure.

DETAILED DESCRIPTION OF THE PREFERRED EMBODIMENT

The preferred embodiment of the present invention will hereafter be described in detail with reference to the drawings.

Figure 1:
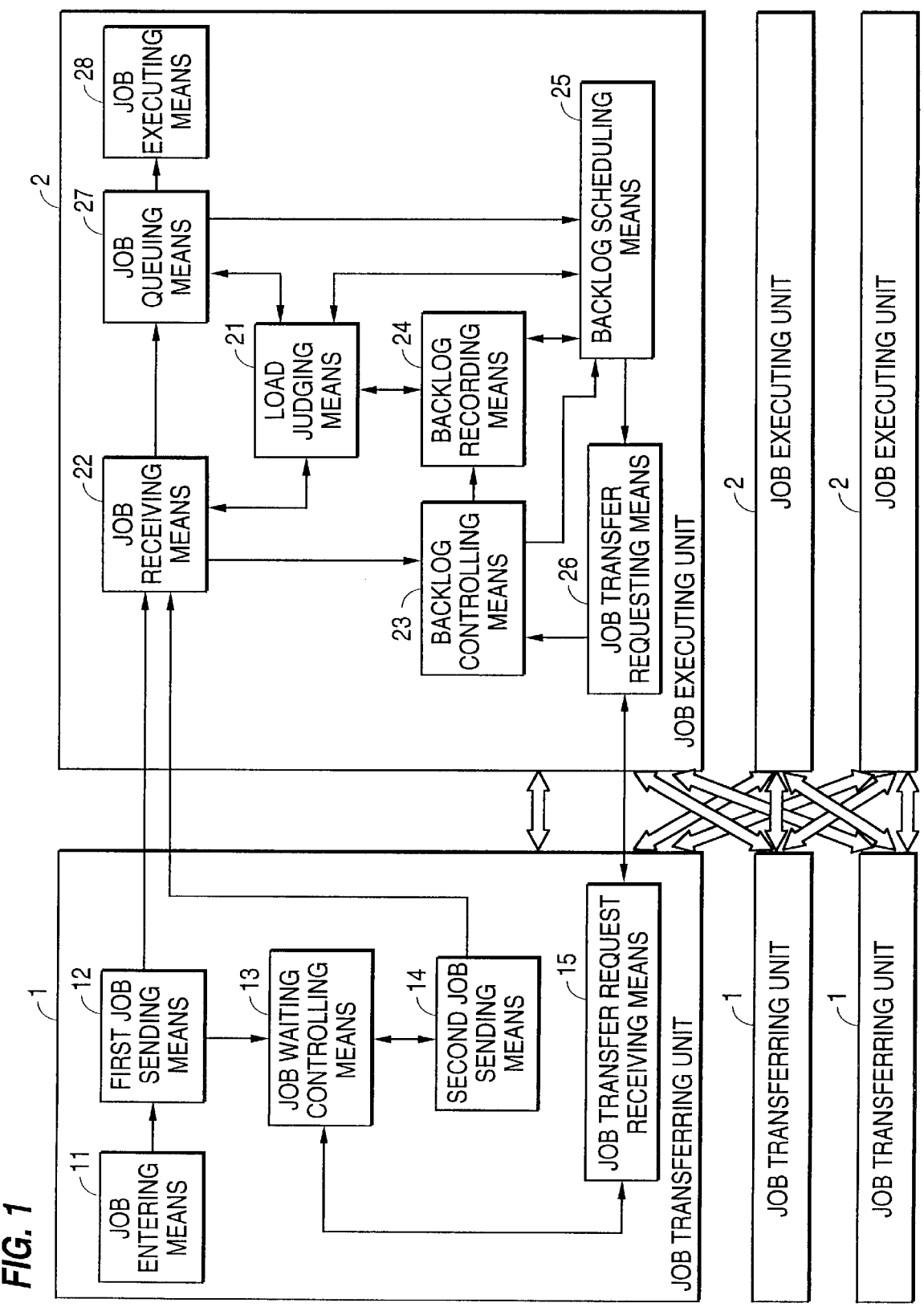
FIG. 1 is a block diagram showing a configuration of a first embodiment of the load distributing job processing system of present invention.

FIG. 1 is a block diagram showing a configuration of a first embodiment of the load distributing job processing system of the present invention.

Figure 4:
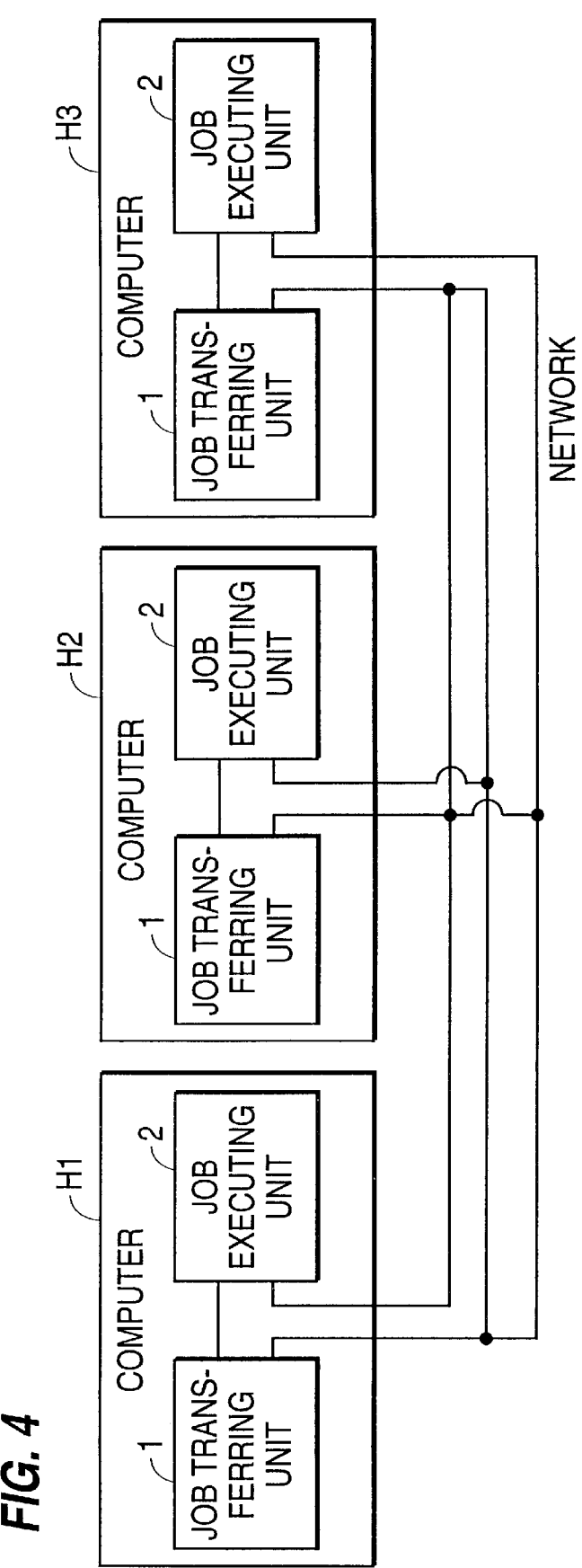
FIG. 4 is a block diagram showing a configuration of a computer system wherein the load distributing job processing system of the present invention is applied.

And, FIG. 4 is a block diagram showing a configuration of a computer system wherein the load distributing job processing system of the present invention is applied. In this embodiment, the load distributing job processing system is applied to a computer system configured by a computer H1, H2, and H3 mutually connected into a network, which will be described. However, the number of the computers configuring the computer system is not limited to three in the present invention.

Each of the computer H1, H2, and H3 comprises a job transfer unit is and a job executing unit 2s. All the job transfer unit 1 and job executing unit 2 are mutually connected.

In this embodiment, the computer H1, H2, and H3 each have one job transferring unit 1 and one job executing unit 2. However, a plurality of the job transferring unit 1s or job executing unit 2s, or a plurality of both the job transferring unit is and job executing unit 2s may sit in one computer, and the job transferring unit 1 or the job executing unit 2 is not needed to sit in an optional computer of the three. However, when a plurality of the job transferring unit is or job executing unit 2s sit in one computer, names (identification information) for identifying each of the plural job transferring unit 1s or the plural job executing unit 2s are to be given.

Referring to FIG. 1, the job transferring unit 1 in one computer (H1, herein) comprises a job entering means 11, first job sending means 12, job waiting controlling means 13, second job sending means 14, and job transfer request receiving means 15. And, the job transferring unit 1 in other computers comprises the same means.

On the other hand, the job executing unit 2 in one computer (H1, herein) comprises a load judging means 21, job receiving means 22, backlog controlling means 23, backlog recording means 24, backlog scheduling means 25, job transfer requesting means 26, job queuing means 27, and job executing means 28. And, the job executing unit 2 in the other computers comprises the same means.

The backlog controlling means 23 generates and erases a backlog corresponding to a job designated by an information from the job receiving means 22 or job transfer requesting means 26, and changes the state.

A backlog corresponding to a job has an area for recording an identification data of the job, identification information on a transfer origin of the job, and state of the backlog. The state of the backlog consists of "schedule waiting state" as an initial state and "transfer waiting state".

When generating a backlog corresponding to a job, the backlog controlling means 23 records the identification data of the job, identification information on the transfer origin of the job, and state of the backlog indicating the "schedule waiting state" on the backlog corresponding to the job, and registers the backlog in the backlog recording means 24.

And, when generating or erasing a backlog corresponding to a job, the backlog controlling means 23 requests the backlog scheduling means 25 to reschedule backlogs.

The job queuing means 27 controls jobs unprocessed and under process and responds with the total number of these jobs to the load judging means 21 when the load judging means 21 inquires.

The job queuing means 27 requests the backlog scheduling means 25 to reschedule the backlog, when the state of jobs unprocessed and under process changes (the job executing means 28 has completed a job or has started a new job).

The first embodiment of the load distributing job processing system of the present invention thus configured will hereafter be described in detail with reference to FIG. 1, 3, and 4.

First, the operation of the job transferring unit 1 starting with a new job input will be described.

When a user enters a new job into the job entering means 11 in the job transferring unit 1 of any computer (the computer H1, in this embodiment) configuring the computer system as shown in FIG. 4, the job entering means 11 receives the job.

Concretely, the "input of a job" is achieved according to the procedure (1) to (3) shown below.
(1) The job transferring unit 1 receives the content of a batch process described by the user.
(2) The content of the batch process is read from resources of anyone of the computers.
(3) A new job is created on the basis of the readout.

The job entering means 11 determines a transfer destination information by means of a predetermined method from the candidates for the job transfer destination (the computer H1, H2, and H3 in this embodiment) and the priority for the transfer destination, and sends the information to the first job sending means 12 with the job. In this embodiment, there exists only one job executing unit 2 and the "computer can be regarded as the transfer destination. However generally, each of plural job executing unit 2s in one computer can be a different destination.

The first job sending means 12 tries to send the job to each of the job executing unit 2s in the computer H1, H2, and H3, according to the priority of the transfer destination information designated by the job entering means 11.

When any one of the job executing unit 2s receives the job, the job transferring unit 1 in the computer H1 completes the process relating to the job.

When any one of the job executing unit 2s does not receive the job on the other hand, the job waiting controlling means 13 records the job in its internal storage area and puts the transfer process relating to the job on waiting.

Next, the operation of the job executing unit 2 in the computer H1 starting with receiving the job transferred by any one of the job transferring unit 1s will be described.

The job receiving means 22 of the job executing unit 2 in the computer H1 receives a job transferred by any one of the job transferring unit 1s. The job receiving means 22 receives an identification information on the computer and job transferring unit 1 of the transfer source of the job (in this embodiment, the identification information on the computer is only needed, since there is only one job transferring unit 1 in one computer) and an identification data of the job.

The job receiving means 22 inquires of the load judging means 21 whether or not the job can be received.

The load judging means 21 judges a current load of the computer (wherein the load judging means 21 itself sits in) and a load generated by the processing of an unprocessed job from a predetermined method, and determines whether the job can be received or not. In the load distributing job processing system of this embodiment, the load judging means 21 uses the judging technique (1) to (3) shown below.
(1) The "number of jobs unprocessed and under process" recorded in the job queuing means 27 and the "number of backlogs in a transfer waiting state" recorded in the backlog recording means 24 are added.
(2) If the added value obtained by (1) is less than a threshold value, the job is judged to be receivable. This threshold value is set to a value close to 0 so as to appropriately distribute the load, i.e., to shorten as much as possible the time during which a job is not processed.
(3) And, when the job is recorded in the backlog recording means 24 as a transfer waiting state, the job is unconditionally judged to be receivable.

The job receiving means 22 records the job in the job queuing means 27 when the job is receivable from a judgment by the load judging means 21, and requests the backlog controlling means 23 to erase the backlog corresponding to the job.

On the other hand, the job receiving means 22 requests the backlog controlling means 23 to generate the backlog corresponding to the job when being unable to receive the job, i.e., rejecting to receive the job, from a judgment by the load judging means 21.

The job recorded by the job queuing means 27 as described above is executed by the job executing means 28 in the recorded order. The job executing means 28 fetches an unprocessed job one after another from the job queuing means 27 and executes the job. To connect plural job executing means 28s to the job queuing means 27, that is, to provide plural job executing means 28s in the job executing unit 2 is also possible. When the job executing means 28 completes a job, a series of processing concerning the job finishes.

The operation of rescheduling a backlog starting with a request to the backlog scheduling means 25 from the backlog controlling means 23 or job queuing means 27 will be described with reference to FIG. 3.

The backlog scheduling means 25 starts rescheduling a backlog when receiving a request for rescheduling a backlog from the backlog controlling means 23 or job queuing means 27 (step 301).

The backlog scheduling means 25 reschedules a backlog according to the procedure (1) to (4) shown below.
(1) First, backlogs in a schedule waiting state are retrieved from all the backlogs recorded in the backlog recording means 24, and then one backlog is determined which corresponds to the most suitable job to be transferred from any one of the job transferring unit is to the job executing unit 2 wherein the backlog scheduling means 25 itself sits in (step 302). In this embodiment, "the oldest backlog" is defined as "the backlog corresponding to the most suitable job to be transferred".
(2) Next, the load judging means 21 judges whether or not it is possible at that moment to receive the job identified by a job identification data recorded on the backlog, i.e., the most suitable job to be transferred (step 304).
(3) If the load judging means 21 judges "the job receivable" at step 304, the backlog scheduling means 25 sends a request to the job transfer requesting means 26 to transfer the job to the job executing unit 2 wherein the backlog scheduling means 25 itself sits in (step 305).
(4) If the load judging means 21 judges "the job not receivable" at step 304, another backlog is determined which corresponds to the second most suitable job to be transferred from all the backlogs recorded in the backlog recording means 24 (step 302), and the judgment at step 303 is performed.

The foregoing process by the backlog scheduling means 25 will be continued to all the backlogs in a schedule waiting state in the backlog recording means 24, until a backlog is determined whereby "the job is judged receivable" at step 304 (step 303).

The job transfer requesting means 26 sends a request, based on the message from the backlog scheduling means 25 at step 305, that the job (hereinafter the object job) be transferred to the computer wherein the job transfer requesting means 26 sits in, to a job transfer origin that an identification information is described on the backlog (hereinafter the object backlog) (step 306). In this job transfer request, an identification information on the computer wherein the job transfer requesting means 26 sits in (including the identification information on the job executing unit 2 when there are plural job executing unit 2s in the computer) and the identification data of the job to be transferred are described.

The job transfer requesting means 26 sends a request to the backlog controlling means 23 to change the state of the object backlog from schedule waiting to transfer waiting just before sending out a transfer request of the job.

The job transfer request receiving means 15' in the job transferring unit 1 (mark' is applied hereinafter to each reference symbol of the means in the job transferring unit 1 in FIG. 1) to which the job transfer request is sent receives a transfer request for the job (step 307).

The job transfer request receiving means 15' inquires the job waiting controlling means 131 whether or not the object job corresponding to a "job identification data" under a transfer request for the job is present in waiting jobs recorded at that moment (step 308).

The job transfer request receiving means 15' responds to the job transfer requesting means 26 issuing the transfer request of the job that the object job cannot be transferred when the job waiting controlling means 13' confirms the object job to be absent at step 308 (step 309).

Receiving the response, the job transfer requesting means 26 recognizes that the object job cannot be transferred, and sends a request to the backlog controlling means 23 to erase the object backlog (step 310).

When the object job is present in the retrieval at step 308, the following (1) to (3) will be processed.
(1) The job transfer request receiving means 15' responds to the job transfer requesting means 26 having issued the job transfer request that the object job can be transferred (step 11).
(2) The job waiting controlling means 13' individually releases the object jobs that cannot have been transferred from the waiting states (step 312).
(3) The second job sending means 14' sends the job released from the waiting state by the job waiting controlling means 13' to the job executing unit 2, i.e., the transfer request origin of the job described in the transfer request of the job (step 313). The difference in the second job sending means 14' from the first job sending means 121 is that the second job sending means 14' tries to transfer a job only to one designated transfer destination.

Figure 3:
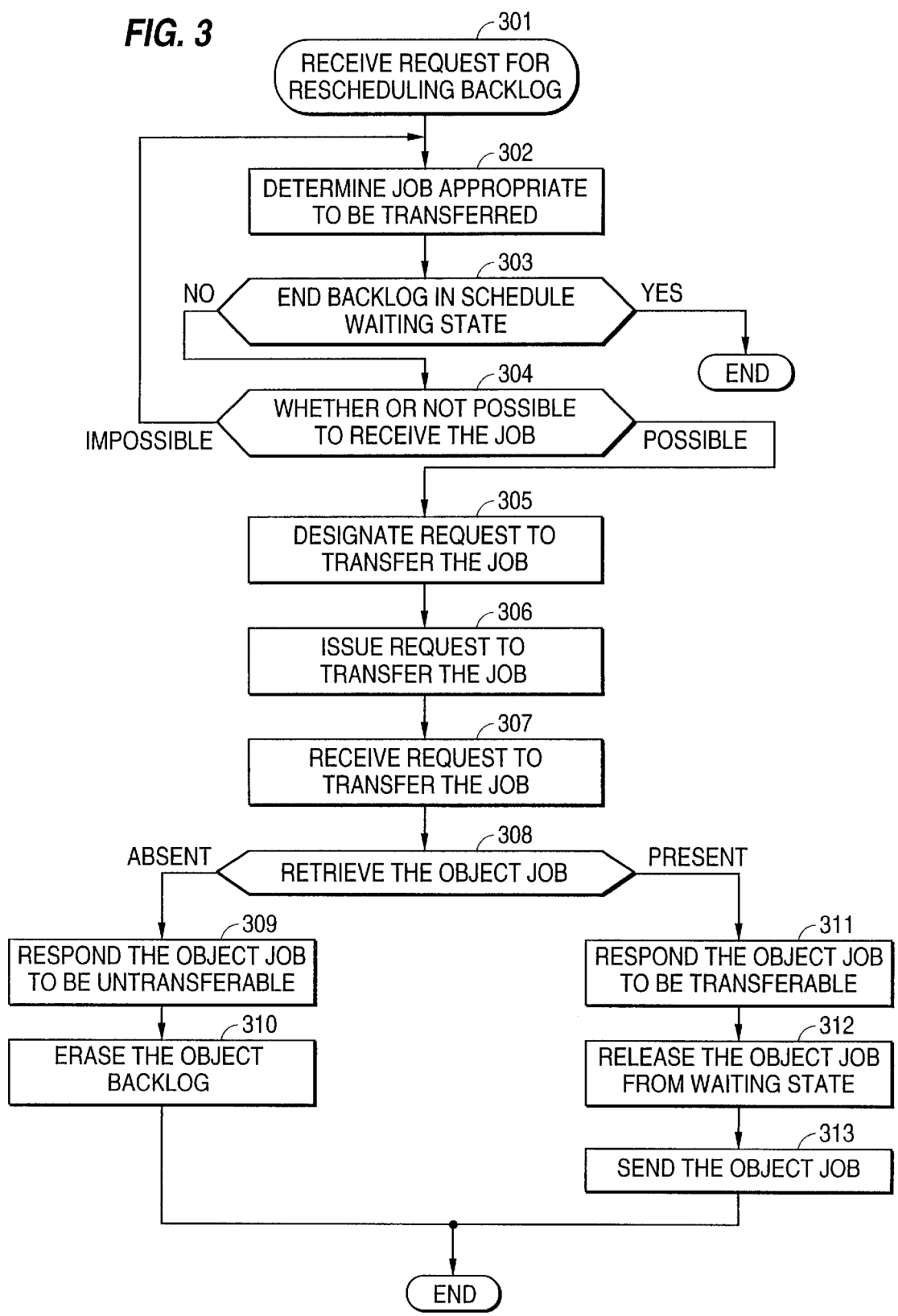
FIG. 3 is a flowchart showing a process in rescheduling a backlog of the load distributing job processing system of the present invention.

And, concerning the process shown in FIG. 3, plural processes are permitted to be performed simultaneously. That is, concerning the "job transfer request" generated by the rescheduling of a backlog, plural requests are permitted to be processed simultaneously.

The processes in the first embodiment of the load distributing job processing system according to the present invention are completed as described above.

The first embodiment of the load distributing job processing system according to the present invention has an effect such that, when the job executing unit completes a job and the load of the computer lowers, the total throughput of a computer system is enhanced by sending a request to the computer of the transfer request origin for the job to transfer the job described on the backlog.

Further, the second embodiment of the load distributing job processing system according to the present invention will hereafter be described.

Figure 2:
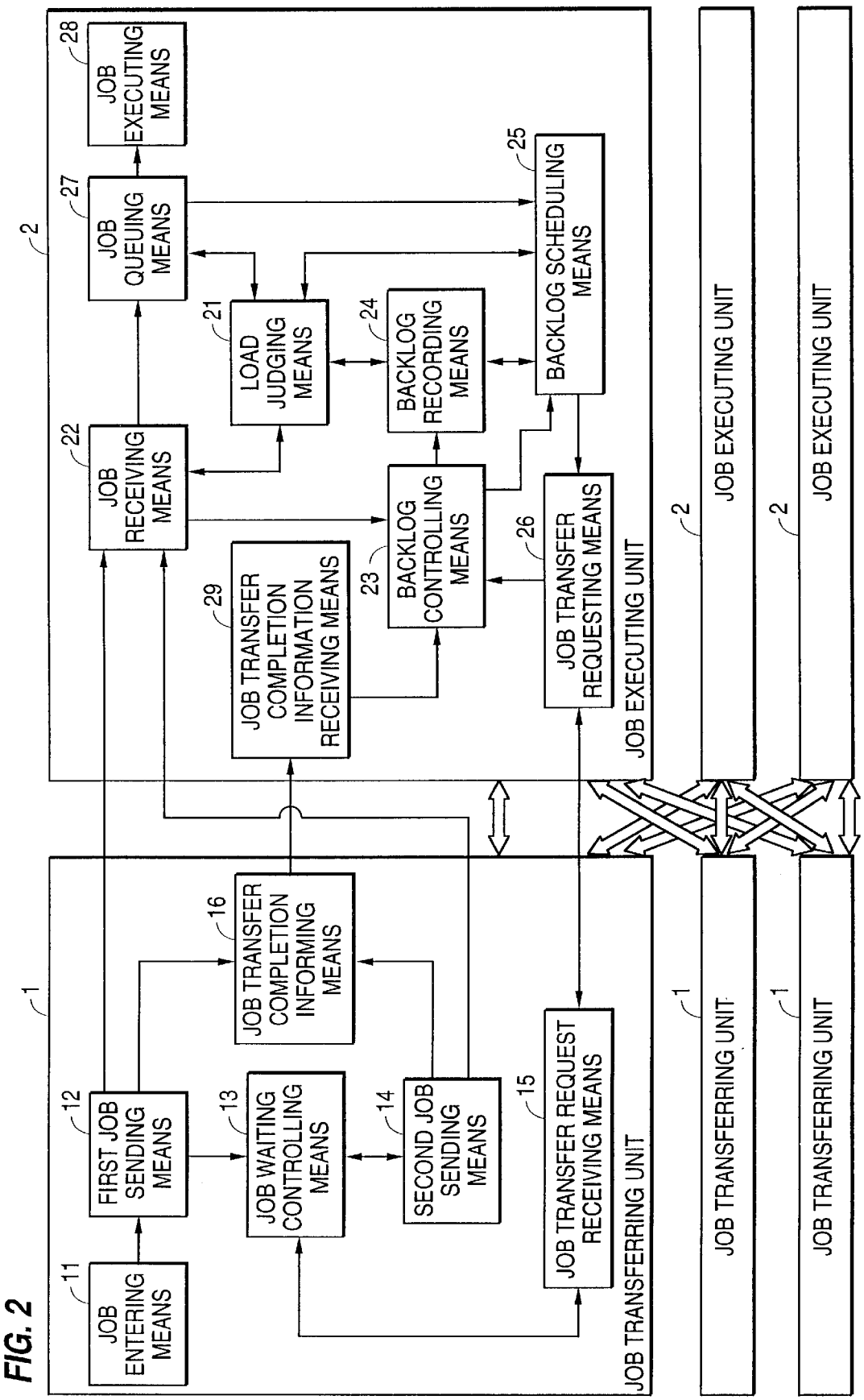
FIG. 2 is a block diagram showing a configuration of a second embodiment of the load distributing job processing system of the present invention.

FIG. 2 is a block diagram showing a configuration of the second embodiment of the load distributing job processing system according to the present invention.

And, FIG. 4 is a block diagram showing a configuration of a computer system wherein the load distributing job processing system of this embodiment is applied.

The load distributing job processing system of the second embodiment is applied, in the same manner as the load distributing job processing system of the first embodiment, to a computer system configured by the computer H1, H2, and H3 connected mutually into a network as shown in FIG. 4.

In the load distributing job processing system of this embodiment, in the same manner as in the load distributing job processing system of the first embodiment, the computer H1, H2, and H3 each have one job transferring unit 1 and one job executing unit 2. However, a plurality of the job transferring unit 1s or job executing unit 2s, or a plurality of both the job transferring unit 1s and job executing unit 2s may sit in one computer, and the job transferring unit 1 or the job executing unit 2 is not needed to sit in an optional computer of the three. However, when a plurality of the job transferring unit 1s or job executing unit 2s sit in one computer, names (identification information) for identifying each of the plural job transferring unit 1s or the plural job executing unit 2s are to be given.

As shown in FIG. 2, the job transferring unit 1 in one computer (H1, herein) comprises a job entering means 11, first job sending means 12, job waiting controlling means 13, second job sending means 14, job transfer request receiving means 15, and job transfer completion informing means 16. And, the job transferring unit 1 in other computers comprises the same means.

On the other hand, the job executing unit 2 in one computer (H1, herein) comprises a load judging means 21, job receiving means 22, backlog controlling means 23, backlog recording means 24, backlog scheduling means 25, job transfer requesting means 26, job queuing means 27, job executing means 28, and job transfer completion information receiving means 29. And, the job executing unit 2 in the other computers comprises the same means.

In the first embodiment shown in FIG. 1 and the second embodiment shown in FIG. 2, the corresponding elements are applied the same reference symbols.

Next, the second embodiment of the load distributing job processing system of the present invention thus configured will hereafter be described in detail with reference to FIG. 2, and 4.

Next, the operation of the load distributing job processing system of this embodiment thus configured will be described. And, since the operations of the job entering means 11, job waiting controlling means 13, job transfer request receiving means 15, load judging means 21, job receiving means 22, backlog recording means 24, backlog scheduling means 25, job queuing means 27, and job executing means 28 are the same as the operations of the means having the same reference symbols in the first embodiment, the description on these will be omitted.

In the load distributing job processing system of the first embodiment, when a job was transferred to a certain computer based on a transfer request, computers not having received the job cannot recognize that the transfer process of the job has been completed.

Assuming that the computer H1 is one of the computers not having received the job, the backlog corresponding to the job remains unerased in the backlog recording means 24, and being subjected to the rescheduling by the backlog scheduling means 25, the backlog can be a object backlog. Therefore, since the backlog is estimated as a load by the load judging means 21, the job executing unit 2 in the computer H1 will not be able to receive a job depending on the circumstances due to the presence of the backlog, inviting a chance that the computer H1 cannot effectively be utilized.

The load distributing job processing system of the second embodiment is provided with the process (1) and (2) as shown below in order to avoid these inconveniences.

(1) When the first job sending means 12 or second job sending means 14 succeeds in transferring a job, the job transfer completion informing means 16 issues a job transfer completion message to all the job executing unit 2s designated as a transfer destination for the job.

(2) When receiving the transfer completion message of the job, the job transfer completion information receiving means 29 in the job executing unit 2 informs a backlog corresponding to the job to the backlog controlling means 23. The backlog controlling means 23 retrieves a backlog corresponding to the job from the backlog recording means 24, and erases the backlog when the backlog is present.

The processes in the second embodiment of the load distributing job processing system according to the present invention are completed as described above.

In the second embodiment of the load distributing job processing system according to the present invention, computers not having received the job can also recognize that a job has been transferred to a certain computer based on a job transfer request, which is a characteristic effect of the second embodiment.

Further as the result, computers not having received the job can delete the backlog corresponding to the job which the computers themselves hold, which removes the load due to the presence of the backlog, producing an effect to enhance the throughput of the computer.

As described hereinabove, the load distributing job processing system of the present invention has an effect to enhance the throughput of a total computer system in which plural computers performing batch processes by jobs are connected into a network.

And, in the computer system in which plural computers performing batch processes by jobs are connected into a network, the load distributing job processing system of the present invention has another effect to even the uneven loads among the computers.

Although the invention has been described in detail above in connection with various preferred embodiments thereof, it will be appreciated by those skilled in the art that these embodiments have been provided solely for purpose of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A load distributing job processing system, including one or more computers, each of the computers comprising:
    at least one job transfer unit; and
    at least one job executing unit,
    wherein each of the job transfer units transfers a job to specified ones of the job executing units; and
    wherein the specified job executing unit, which is provided on the computer whose load is low, receives and executes the job transferred by the job transfer unit, and
    wherein the specified job executing unit, which is provided on the computer whose load is high, does not receive the job for execution, and instead stores data specifying the job in a backlog, and thereafter fetches the data specifying the job from the backlog when the load of the computer becomes low, and thereafter requests the job transfer unit to transfer the job specified by the fetched data, and thereafter receives and executes the job.

2. A load distributing job processing system set forth in claim 1, wherein the job transfer unit comprises:
    first job sending means for entering the job and transferring the job to the job executing unit designated as a transfer destination for the job;
    job waiting controlling means for recording the job in a waiting state when the job executing unit does not receive the job transferred by the first job sending means; and
    second job sending means for receiving a job transfer request transferred from the job executing unit, releasing a job designated in the job transfer request, of the jobs recorded by the job waiting controlling means, from the waiting state, and transferring the job to the job executing unit designated in the same manner.

3. A load distributing job processing system set forth in claim 1, wherein the job transfer unit comprises:
    job entering means for entering the job and designating at least one of the job executing units to which the job is transferred as a transfer destination;
    first job sending means for transferring the job entered by the job entering means to the job executing unit designated as the transfer destination;
    job waiting controlling means for recording the job in a waiting state when any of the job executing units does not receive the job transferred by the first job sending means;
    job transfer request receiving means for receiving a job transfer request transferred from the job executing unit, and releasing a job designated in the job transfer request, of the jobs recorded by the job waiting controlling means, from the waiting state; and
    second job sending means for transferring the job released from the waiting state by the job transfer request receiving means to the job executing unit designated in the job transfer request.

4. A load distributing job processing system including one or more computers, each of the computers comprising:
    at least one job transfer unit, and
    at least one job executing unit,
    wherein each of the job transfer units transfers a job to specified ones of the job executing units; wherein the job executing unit comprises:
        load judging means for calculating the load of the computer of the job executing unit from a preset criterion and based on the calculated result judging whether or not to receive the job transferred from the job transfer unit;
        job receiving means for receiving the job transferred from the first job sending means or the second job sending means when the load judging means judges to receive the job;
        backlog controlling means for generating as a backlog an information on the job that the job receiving means did not receive when the load judging means judged not to receive the job, and requesting rescheduling the backlog when the backlog was generated or deleted;
        backlog recording means for recording a backlog generated by the backlog controlling means;
        job queuing means for sequentially recording jobs received by the job receiving means on a queue, and requesting rescheduling the backlog when there are any changes in the states of jobs under process or unprocessed;

backlog scheduling means, for responding to the request for rescheduling the backlog from the backlog controlling means or the job queuing means, fetching an object backlog from the backlog recording means to acquire an information on the job recorded on the backlog, and judging whether or not to receive the job by the load judging means;

wherein the job transfer unit comprises:

a first job sending means for entering the job and transferring the job to the job executing unit designated as a transfer destination for the job;

job waiting controlling means for recording the job in a waiting state when the job executing unit does not receive the job transferred by the first job sending means; and second job sending means for receiving a job transfer request transferred from the job executing unit, releasing a job designated in the job transfer request, of the jobs recorded by the job waiting controlling means, from the waiting state, and transferring the job to the job executing unit designated in the same manner;

wherein the specified job executing unit, which is provided on the computer whose load is low, receives and executes the job transferred by the job transfer unit, and wherein the specified, job executing unit, which is provided on the computer whose load is high, does not receive the job for execution, and instead stores data specifying the job in a backlog, and thereafter fetches the data specifying the job from the backlog when the load of the computer becomes low, and thereafter requests the job transfer unit to transfer the job specified by the fetched data, and thereafter receives and executes the job.

5. A load distributing job processing system set forth in claim 4, wherein:

the job transfer unit further includes a job transfer completion informing means for informing all the job executing units designated as a transfer destination for the job that the transfer of the job is completed when the first job sending means or second job sending means succeeds in transferring the job;

the job executing unit further includes a job transfer completion information receiving means for receiving the information that the transfer of the job is completed from the job transfer completion informing means and requests the backlog controlling means to delete the backlog relating to the job;

and the backlog controlling means further deletes the backlog requested by the job transfer completion information receiving means from the backlog recording means.

6. A load distributing job processing system set forth in claim 4, wherein the load judging means judges that the job can be received when the added value by the number of jobs under process and unprocessed recorded on the job queuing means and the number of the backlogs in transfer waiting state recorded on the backlog recording means is less than the preset threshold value.

7. A load distributing job processing system set forth including one or more computers, each of the computers comprising:

at least one job transfer unit; and at least one job executing unit, wherein each of the job transfer units transfers a job to specified ones of the job executing units;

wherein the job executing unit comprises:

load judging means for calculating the load of the computer of the job executing unit from a preset criterion and based on the calculated result judging whether or not to receive the job transferred from the job transfer unit;

job receiving means for receiving the job transferred from the first job sending means or the second job sending means when the load judging means judges to receive the job;

load judging means for calculating the load of the computer of the job executing unit from a preset criterion and based on the calculated result judging whether or not to receive the job transferred from the job transfer unit;

job receiving means for receiving the job transferred from the first job sending means or the second job sending means when the load judging means judges to receive the job;

backlog controlling means for generating as a backlog an information on the job that the job receiving means did not receive when the load judging means judged not to receive the job, and requesting rescheduling the backlog when the backlog was generated or deleted;

backlog recording means for recording a backlog generated by the backlog controlling means;

job queuing means for sequentially recording jobs received by the job receiving means on a queue, and requesting rescheduling the backlog when there are any changes in the states of the jobs under process or unprocessed;

backlog scheduling means, for responding to the request for rescheduling the backlog from the backlog controlling means or the job queuing means, fetching an object backlog from the backlog recording means to acquire an information on the job recorded on the backlog, and judging whether or not to receive the job by the load judging means;

job transfer requesting means for requesting transferring the job to the job transfer unit when the backlog scheduling means judges to receive the job; and job executing means for fetching the job one after another from the head of the queue of the job recorded by the job queuing means, and executing the job;

wherein the job transfer unit comprises:

a first job sending means for entering the job and transferring the job to the job executing unit designated as a transfer destination for the job;

job waiting controlling means for recording the job in a waiting state when the job executing unit does not receive the job transferred by the first job sending means;

job transfer request receiving means for receiving a job transfer request transferred from the job executing unit, and releasing a job designated in the job transfer request, of the jobs recorded by the job waiting controlling means, from the waiting state; and second job sending means for receiving a job transfer request transferred from the job executing unit, releasing a job designated in the job transfer request, of the jobs recorded by the job waiting controlling means, from the waiting state, and transferring the job to the job executing unit designated in the same manner; and wherein the specified job executing unit, which is provided on the computer whose load is low, receives and executes the job transferred by the job transfer unit, and wherein the specified job executing unit, which is provided on the computer whose load is high, does not receive the job for execution, and instead stores data specifying the job in a backlog, and thereafter fetches the data specifying the job from the backlog when the load of the computer becomes low, and thereafter requests the job transfer unit to transfer the job specified by the fetched data, and thereafter receives and executes the job.

8. A load distributing job processing system set forth in claim 5, wherein the load judging means judges that the job can be received when the added value by the number of jobs under process and unprocessed recorded on the job queuing means and the number of the backlogs in transfer waiting state recorded on the backlog recording means is less than the preset threshold value.

9. A load distributing job processing system set forth in claim 7, wherein:

the job transfer unit further includes a job transfer completion informing means for informing all the job executing units designated as a transfer destination for the job that the transfer of the job is completed when the first job sending means or second job sending means succeeds in transferring the job;

the job executing unit further includes a job transfer completion information receiving means for receiving the information that the transfer of the job is completed from the job transfer completion informing means and requests the backlog controlling means to delete the backlog relating to the job;

and the backlog controlling means further deletes the backlog requested by the job transfer completion information receiving means from the backlog recording means.

10. A load distributing job processing system set forth in claim 9, wherein the load judging means judges that the job can be received when the added value by the number of jobs under process and unprocessed recorded on the job queuing means and the number of the backlogs in transfer waiting state recorded on the backlog recording means is less than the preset threshold value.

* * * * *